Aug. 29, 1961  O. W. GRAHAM  2,997,878
PETROLEUM TANK GAGE
Filed May 12, 1958
2 Sheets—Sheet 1
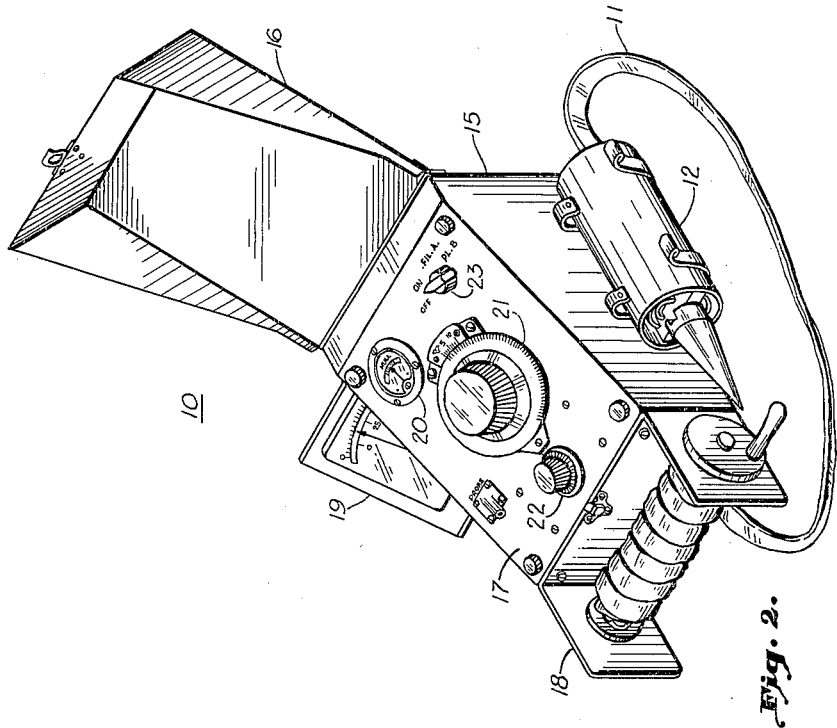
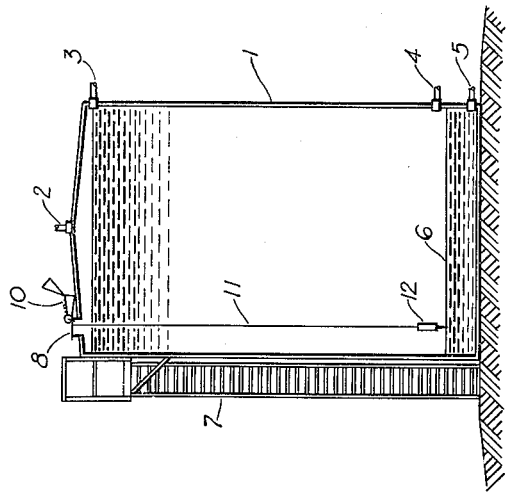
INVENTOR.
Ollie W. Graham
BY Arthur L. Wade

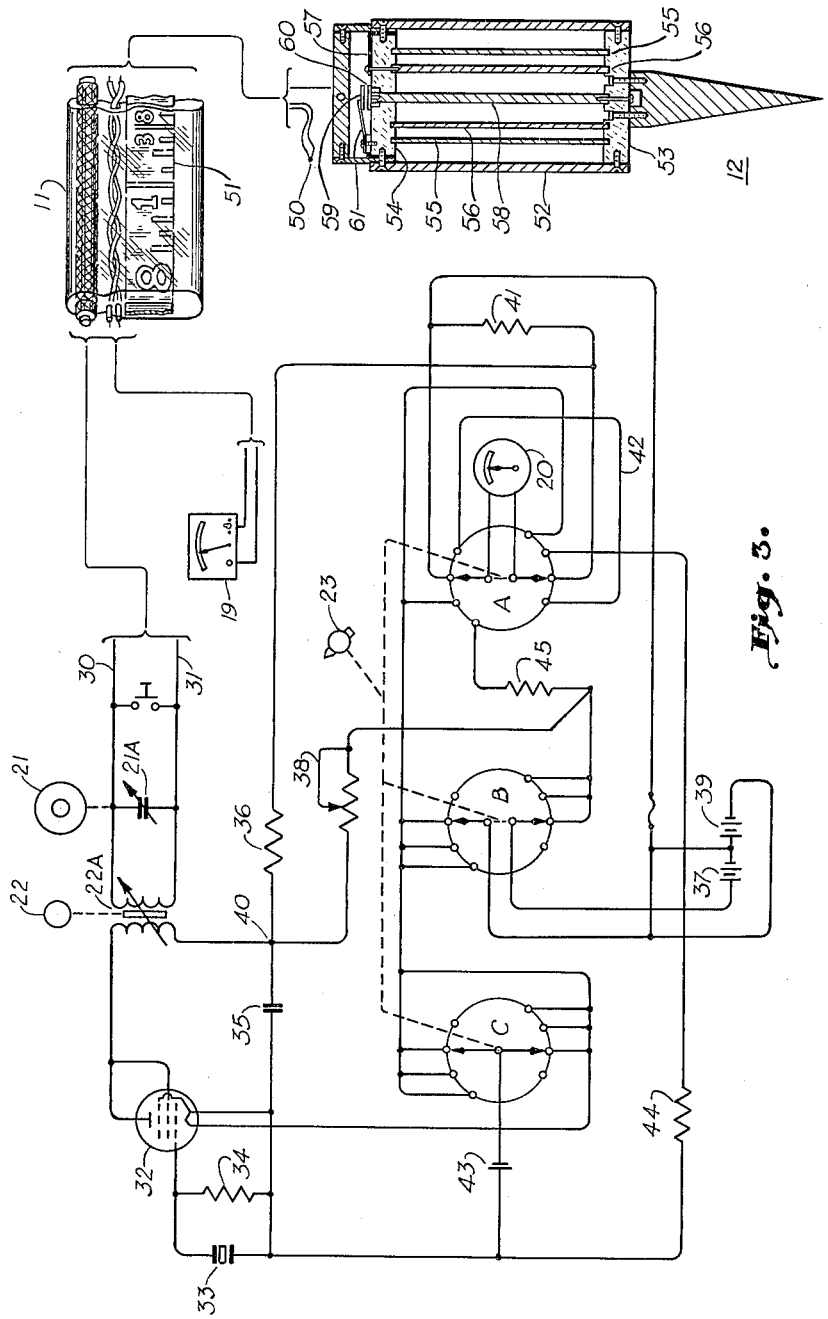

United States Patent Office 2,997,878
Patented Aug. 29, 1961

2,997,878
PETROLEUM TANK GAGE
Ollie William Graham, Tulsa, Okla., assignor to Instruments, Inc., Tulsa, Okla., a corporation of Oklahoma
Filed May 12, 1958, Ser. No. 734,565
1 Claim. (Cl. 73—304)

The present invention relates to the measurement of the contents of containers, or tanks. More specifically, the invention relates to measurement of the quantity and quality of petroleum in storage tanks as a condition of sale and delivery of the petroleum to a gathering system.

Fluid produced by an oil well is separated into its various liquid and gaseous phases as near to the wellhead as practical. Free water is knocked from the well stream. The remaining water-oil emulsion is substantially broken. The gas evolved and separated may be used as a heat exchange medium, or as fuel, on the lease, before delivery to a point of further use. The liquid petroleum broken from the emulsion, in treating, contains foreign matter of various kinds, and water. This impurity is usually referred to as bottom sediment and water. The percentage of this B.S. and W. in the treated liquid petroleum stored in a lease tank is an important factor of the sale of the oil. Additionally, the distribution of the B.S. and W. must be known, relative to the point of draw-off of the tank contents.

The present practice with which to ascertain B.S. and W. at a specific level in a tank includes the use of a "thief." The "thief" is a mechanical device which can be lowered in the tank of liquid to the level at which it is desired to ascertain the percentage of B.S. and W. The device is mechanically actuated to isolate a sample. The sample is then withdrawn and analyzed for its percentage of B.S. and W.

The present analysis of samples withdrawn between the top of the tank and the point at which the tank liquid is drawn off includes the use of a centrifuge. The sample is rotated by a centrifuge, at a predetermined temperature. The percentage of B.S. and W. forced from the sample is measured by a sight gage.

Under present practices, crude oil is accepted as merchantable if it contains less than 1 percent B.S. and W. If the samples "thiefed" down to the level of the draw-off show less than 1 percent the tank is designated as acceptable. However, a record of distribution of B.S. and W. below the draw-off point is desired. At the very bottom of the tank there may collect sediment having the consistency of asphalt. From this very viscous material, the B.S. and W. percentage has a gradient up to the 1 percent level. As this 1 percent level has the vital relation to saleability of the oil, it is necessary to detect it accurately with respect to the draw-off point in order to form the basis of a clean-out program for the tank.

It is common practice to drop a thief through the 1 percent layer, to the tank bottom to obtain its cross section, at least roughly. The gager uses his judgment to arrive at the height of the 1 percent layer. He may check his judgment against the analysis of a centrifuge. Obviously the present procedure to obtain a record of B.S. and W. distribution below the draw-off point is both time-consuming and laborious. The present invention now provides an accurate and continuous detection of both the concentration and distribution of B.S. and W. in a tank of crude petroleum, giving the precise location of the 1 percent layer.

The depth of fluid in the tank is a fundamental requirement in the gaging operation. The depth is the basis for the calculation of the gross units of oil in the tank. The present invention provides a gage, in combination with the B.S. and W. detector, to give this required information at the time the B.S. and W. percentage is ascertained.

The temperature of the tank fluid is also required. Oil is generally sold on the basis of being at some standard temperature, such as 60° F. Temperature measuring apparatus is also combined with the B.S. and W. detector and depth gage in order to give temperature information at the time the other factors are determined.

An object of the present invention is to simultaneously ascertain the percentage of B.S. and W. in a tank of petroleum, the depth of the oil and the temperature of the oil.

Another object is to determine the height of the unsaleable layer of B.S. and W. in a tank of petroleum, relative to the draw-off point, to determine if the liquid can be drawn off in sale.

Another object is to utilize a single electric indicator to selectively exhibit the condition of the voltage sources for the circuit of B.S. and W. detector and resonance condition of the circuit of a B.S. and W. detector.

Another object is to provide a shorting circuit for the electric indicator of the B.S. and W. detector and a circuit for establishing the sensitivity of the indicator to the detector circuit output.

Another object is to provide for manual return of B.S. and W. detector circuit to resonance at a plurality of points which provides for the detector circuit to be adjusted to a standard resonance condition from which deviation may be manifested.

Another object is to provide for the automatic temperature adjustment of the response of a primary element of a B.S. and W. detector circuit to a mixture of petroleum and B.S. and W.

The present invention contemplates an electronic detection circuit responsive to dielectric constant changes of B.S. and W. and petroleum mixtures with a detecting probe suspended on the end of a cable including a length gage and thermocouple leads. The electronic circuit continuously responds to the capacitance changes of the probe as the probe is lowered into a tank of petroleum and B.S. and W. The length gage, combined with the probe cable, simultaneously gives the operator a sight reading of probe depth in the tank of liquid. The thermocouple junction of leads in the cable is arranged in proximity to the probe so as to respond to the liquid temperature at probe depth. The thermocouple is included in an electric circuit which exhibits the temperature to an operator at the location in proximity to the exhibitions of the capacitance changes of the probe.

The invention further contemplates a crystal-controlled vacuum tube circuit capable of executing sustained oscillations and having an electrically-resonant portion and a D.-C. indicator in the plate circuit of the vacuum tube. A switch is arranged in the circuit to selectively connect, to the indicator, the plate circuit through a fixed sensitivity shunt, the battery supply for the filament of the vacuum tube and the battery supply for the plate circuit.

The invention further contemplates a crystal-controlled vacuum tube circuit capable of sustained oscillations connected to a probe applying a capacitance value to the plate circuit in parallel with an adjustable inductance and an adjustable capacitance. Each adjustable device will separately return the circuit to resonance following a change in capacitance signal from the probe. The standard of dielectric constant for the material to which the probe is exposed may be established by the inductance and deviations may be calibrated on the adjusting mechanism of the capacitance.

The invention further contemplates a crystal-controlled vacuum tube circuit capable of sustained oscillations connected to a capacitance probe through its plate circuit, the probe having a plate movable by a bi-metallic element responsive to temperature to adjust the capacitance of the probe to a predetermined value at a predetermined temperature. The oscillation circuit thereby responds to inputs based on the predetermined temperature.

Other objects and advantages and features of this invention will become more apparent to one skilled in the art upon consideration of the written specification, appended claim and attached drawings, wherein—

FIG. 1 is a diagrammatic elevation in cross section of a tank of petroleum being gaged by an embodiment of the invention;

FIG. 2 is an isometric representation of the external form of the embodiment of the invention employed in FIG. 1; and FIG. 3 is a diagrammatic representation of the electric circuit employed by the embodiment of the invention in FIG. 2.

Referring to FIG. 1, there is shown a tank 1 in which crude petroleum is collected from one or more wellheads for sale to a pipeline. A vent 2 at the top is customary, as conduits 3, 4 and 5 are illustrations of customary draw-off and filling points in the tank wall. Conduit 4 is at the customary draw-off point for sales to a pipeline. The heavy B.S. and W. in the bottom of the tank has a 1 percent level 6. It is usually stipulated by a purchaser that this collection, of sediment and water, often so viscous as to more accurately be termed "sludge," be a predetermined distance below draw-off conduit 4 before the tank is drained in a sales transfer.

The level 6 must be determined accurately, relative to draw-off conduit 4. Further, the percentage of B.S. and W. in the petroleum above level 6 must be accurately determined. The embodiment of the invention illustrated ascertains these variables.

Walkway 7 is a means whereby personnel may work at the top of tank 1. A thief hatch 8 is provided in the top of tank 1, adjacent walkway 7, to enable personnel to lower instruments into the petroleum of tank 1 and determine the marketability of the oil. The present invention employs this same opening heretofore used by a gager in executing the present tedious and time-consuming gaging operation.

An instrument 10 is shown as placed adjacent thief-hatch 8 and a cable 11 as extending down into the tank fluid. A probe 12 is indicated at the end of cable 11. Probe 12 is the primary element of the B.S. and W. detection circuits of instrument 10 and has sufficient weight to keep cable 11 taut and vertical. Instrument 10, so positioned at thief-hatch 8, enables a gager to obtain all the essential information he needs to determine the marketability of the oil in the tank 1.

A closer inspection of the external appearance and functional features of instrument 10 is afforded by FIG. 2. The various components and circuit of the instrument are housed in case 15. A lid 16 is shown as swung upward to enable personnel to operate the controls and view the panel 17. Probe 12 is shown as clamped in brackets on one side of case 15 transport. On the front of case 15 is a reel assembly 18 on which cable 11 may be conveniently wound when not in use. On the far side from a viewer of FIG. 2, the instrument case 15 has a temperature meter 19, responsive to a thermocouple, which can be swung into view as shown or folded into a recess in the interior of case 15.

On the panel 17, a meter 20 is mounted to exhibit the capacitance condition to which probe 12 is exposed. Calibrated knobs and dials 21 and 22 are manipulated by gaging personnel, from the information of meter 20. Knob 23 controls the circuit of the instrument to cause the meter 20 to perform a plurality of functions. In this one package, a gager has the means with which to determine the height of the oil in tank 1, the temperature of the oil, and the percentage and distribution of the B.S. and W. in the oil. Further, he has the means with which to check the operativeness of the circuit as well as the condition of the power supplies for the circuit. Heretofore, no means comparable to this instrument has been placed at the disposal of a field gager in the petroleum industry.

Referring to FIG. 3, there is shown the complete circuit for responding to the signals of probe 12. The cable 11 is shown in more detail as functioning to physically associate the leads between the probe and its circuit with the leads between the thermocouple and its circuit with the length gage. The knobs 21 and 22 on panel 17 are indicated as they function as means through which to adjust components in the circuit of the probe. Finally, the three-deck, four position switch positioned through knob 23 is indicated, connected into the circuit.

The circuit disclosed in FIG. 3 is a crystal-controlled vacuum tube circuit capable of executing sustained oscillations and having an electrically-resonant portion in the plate circuit of the vacuum tube. Some of the features of the circuit are disclosed in at least Gunst et al. 2,720,-624. The proble 12 is connected to this circuit as an electrical condenser. Specifically, the probe 12 has a form of capacitance plates, connected by leads 30 and 31 to variable inductance 22A. In parallel, across leads 30 and 31, is variable capacitance 21A and a manually actuated switch.

This circuit of FIG. 3 may be described as undergoing a change in the D.-C. plate current of its vacuum tube when the plate circuit is detuned from a resonant condition. Detuning may occur from a change in the capacitance value across the plates of probe 12 or a change in the settings of inductance 22A or capacitance 21A. Also, the circuit may be tuned, returned to resonance, by adjustment of inductance 22A or capacitance 21A.

Oscillator tube 32 and quartz crystal 33 are characteristic components of this type of circuit. The quartz crystal is connected in the grid circuit of tube 32. The grid circuit also contains grid resistor 34 connected in parallel with crystal 33. A by-pass condenser 35 is connected between the tuned plate circuit and the cathode. The level of the D.-C. plate current is exhibited on meter 20.

Meter 20 and resistor 36 are to be traced as connected in one side of a parallel circuit. Deck A is positioned in FIG. 3 to make this connection. Through deck B, battery 37 and variable resistance 38 are placed in the other side of the parallel circuit.

The parallel circuit is then to be traced as arranged in series with battery 39 and the cathode circuit of tube 32. When variable resistor 38 is adjusted to bring the oscillator circuit into resonance, the positive voltages appearing at the common connection 40 are equal. No current will then flow through meter 20. When the oscillator circuit is detuned, by any of the three means illustrated, tube 32 draws a large D.-C. current. The voltage will drop at common connection 40, resulting in a current flow back through meter 20 which will cause it to deflect.

The four-position, three-deck, switch manipulated by knob 23 serves four functions. In the position illustrated in FIG. 3, it connects all of the batteries to the circuit and the shunt resistor 41 to meter 20. This is the "on" position. In the "off" position, meter 20 is shorted with connection 42, through deck A, so the meter will be dampened and jarring the instrument will not damage this meter 20. In "filament A" position, the filament battery 43 is connected to meter 20 through resistance 44. In this position, the voltage of battery 43 is indicated by meter 20. In the "plate B" position, the plate batteries 37 and 39 are connected to meter 20 through a resistance 45. Thus, meter 20 serves as a check for the condition of the batteries as well as an indication of the resonance condition of the circuit.

Returning to a consideration of cable 11, it can be seen that leads 30 and 31, between the oscillator circuit and probe 12, are carried within cable 11. Also, the leads between instrument 19 and thermocouple 50 are carried in cable 11. Alongside the leads is a length of metal tape 51, marked in inches. These three elements parallel leads and tape, are made up into a unitary body with the material of cable 11.

The body of cable 11 is plastic. A plastic which is both flexible and transparent and resistant to corrosion of the content of the tank is required for this purpose. The transparency enables the ready observation of metal tape 51 with respect to the height of the liquid in which the tape is immersed. It is readily apparent, that with the length gage 51 embedded in cable 11, along with leads between temperature meter 19 and thermocouple 50 and circuit meter 20 and probe 12, the several functions of the instrument 10 can be carried out and properly noted by a gager working on walkway 7 at thief hatch 8.

In final consideration, probe 12, in FIG. 3, has been illustrated in its several components, particularly with respect to the structure which compensates for temperature variation. Continuous and automatic compensation of the probe and circuit combination is desirable in order to maintain their relation equivalent to having the probe of a constant value of capacitance over a predetermined range of temperature. If this compensation is not made, the readings of calibrated dials 21 and 22 will have to be compensated. Therefore, the present invention provides for automatic adjustment of the capacitance value of the probe 12 so the changes in dielectric constant of the petroleum and B.S. and W. mixture will be the sole factor effective to change the probe signal across lines 30 and 31.

The desired compensation could be accomplished by arranging a resistance in the plate circuit of the vacuum tube responsive to the temperature to which the probe is responsive. The change in resistance, in the proper direction, will change the match between the probe and circuit in the direction which will give the desired results. However, rather than make the compensation depend on varying the electrical response of a circuit element in accordance with temperature, the present embodiment of the invention utilizes the technique of varying the spacing between capacitance plates of the probe with temperature.

Probe 12 has been illustrated in section to show that its capacitance plates are made up of a center electrode and a series of concentric cylinders. Outer cylinder 52 has an insulator 53 in its bottom and an insulator 54 in its top. These insulators may be made of nylon to provide the required structural strength and electrical insulating property. Structurally, these insulators support cylinders 55 and 56. Cylinder 56 is electrically connected at 57 to form one capacitance plate while cylinder 55 and center rod 58 are electrically connected to form the other plate. The mixture of petroleum and B.S. and W. between these cylinders and rod establishes the capacitance signal across lines 30, 31.

As the probe is exposed to various mixtures of petroleum and B.S. and W. having varying temperatures, the capacitance between the plates 52, 56 and 55, 58 changes. If the distance between the plates were adjusted in accordance with temperature, the capacitance would remain constant. The present invention effectively adjusts the plate distance with a bi-metallic element responding to temperature.

A plate 59 is suspended above a plate 60 fixed to the end of rod 58. Plate 59 is suspended by a bi-metallic strip 61 which is electrically connected to outer cylinder 52. As the temperature of the mixture in which the probe is inserted goes up, the strip 61 lowers plate 59 with respect to plate 60. The capacitance of the entire probe 12 is thereby adjusted to remain a constant value with temperature change.

As a practical matter, the operation of the instrument is simple. The probe 12 is lowered into the tank after the dial 22 has set inductance 22A to a value which will bring meter 20 to a null position for the type of petroleum in the tank without B.S. and W. As the probe is lowered and encounters percentages of B.S. and W. in the petroleum the meter 20 will deflect from its null position. Adjustment of 21 in setting the capacitance of 21A will return the meter 20 to null. The dial of 21 can be directly calibrated in B.S. and W., or graduated to numbers which can be taken into a chart for the particular petroleum gaged to obtain the B.S. and W. percentage. This reading, together with the temperature reading on meter 19 and the depth reading on tape 51, enables the gager to determine substantially all of the information needed on which to base acceptance by the pipeline of the tank of petroleum. Thus at one location, and in one operation, substantially all the work of the gager is accomplished.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

A portable instrument for gaging the B.S. and W. in a tank of petroleum produced in the field from an oil well including, a crystal-controlled vacuum tube circuit capable of executing sustained oscillations and having an electrically-resonant portion in the plate circuit of the vacuum tube, a capacity unit connected in the resonant portion of the electronic circuit and adapted to be exposed directly to the petroleum in the tank, a bi-metallic element mounted on one plate of the capacity unit, a capacity plate mounted on the bi-metallic element and adapted to move as the bi-metallic element moves with changing temperature in relation to the other plate of the capacity unit, whereby the capacity unit is automatically and continuously matched to the electronic circuit to maintain their relation equivalent to having the capacity unit at a constant value of capacitance over a predetermined range of temperature, a direct-current indicator connected in the plate circuit of the vacuum tube to exhibit the circuit oscillation, and a calibrated adjustable inductance included in the connection between the capacity unit and the resonant portion of the electronic circuit for maintaining the plate circuit tuned and in a resonant condition as the capacity unit is exposed to a mixture of petroleum and B.S. and W. while simultaneously exhibiting the amount of B.S. and W. in the mixture.

References Cited in the file of this patent
UNITED STATES PATENTS

| | | |
|---|---|---|
| 1,498,960 | Gardner | June 24, 1924 |
| 1,822,203 | Collins | Sept. 8, 1931 |

(Other references on following page)

UNITED STATES PATENTS

| | | |
|---|---|---|
| 2,015,968 | Ryder | Oct. 1, 1935 |
| 2,201,106 | Fox | May 14, 1940 |
| 2,375,084 | Coronite et al. | May 1, 1945 |
| 2,455,520 | Prudhon et al. | Dec. 7, 1948 |
| 2,576,836 | Hilsinger | Nov. 27, 1951 |
| 2,602,233 | Irving | July 8, 1952 |
| 2,611,021 | Perls et al. | Sept. 16, 1952 |
| 2,674,409 | James | Apr. 6, 1954 |
| 2,691,223 | Oberlin | Oct. 12, 1954 |
| 2,720,624 | Gunst et al. | Oct. 11, 1955 |
| 2,760,373 | Quist | Aug. 28, 1956 |
| 2,765,440 | Adelman et al. | Oct. 2, 1956 |
| 2,767,584 | Franzel et al. | Oct. 23, 1956 |
| 2,794,081 | Luhn | May 28, 1957 |
| 2,826,625 | MacDonald | Mar. 11, 1958 |

FOREIGN PATENTS

| | | |
|---|---|---|
| 571,855 | France | Feb. 9, 1924 |